(12) United States Patent
Aull et al.

(10) Patent No.: US 7,149,839 B2
(45) Date of Patent: Dec. 12, 2006

(54) WIRELESS USB HARDWARE SCHEDULING

(75) Inventors: Randall E. Aull, Kenmore, WA (US);
Firdosh Bhesania, Kirkland, WA (US);
Glen T. Slick, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 178 days.

(21) Appl. No.: 11/004,429

(22) Filed: Dec. 3, 2004

(65) Prior Publication Data

US 2006/0123181 A1    Jun. 8, 2006

(51) Int. Cl.
*G06F 13/36* (2006.01)
*H04B 7/00* (2006.01)
*H04L 1/00* (2006.01)
*H04Q 7/00* (2006.01)
*G06F 3/00* (2006.01)
*H04L 12/56* (2006.01)

(52) U.S. Cl. ............... 710/310; 710/124; 710/313; 370/310

(58) Field of Classification Search ........ 710/310, 710/52, 54, 58, 74, 124, 313, 33; 719/314; 702/127; 709/217, 227; 711/100, 112; 370/310, 370/349, 912; 455/95, 74.1, 41.2; 712/231; 714/2, 18; 340/5.61
See application file for complete search history.

(56) References Cited

U.S. PATENT DOCUMENTS 6,243,753 B1 * 6/2001 Machin et al. ............ 709/227
6,378,005 B1 * 4/2002 Hyder et al. ............. 719/321
6,603,744 B1 * 8/2003 Mizutani et al. ........... 370/310
6,651,171 B1 * 11/2003 England et al. ........... 713/193
6,788,676 B1 * 9/2004 Partanen et al. ........... 370/352
6,950,859 B1 * 9/2005 Bartek et al. ............. 709/217
2006/0123181 A1 * 6/2006 Aull et al. ................ 710/310

OTHER PUBLICATIONS

"A novel architecture of Home gateway for efficient packet process" by Cho et al. (abstract only) Publication Date:Jul. 10-12, 2002.*

* cited by examiner

*Primary Examiner*—Gopal C. Ray
(74) *Attorney, Agent, or Firm*—Workman Nydegger

(57) ABSTRACT

In wireless USB data transfers over UWB, software configures hardware thresholds to control data transfer in a manner that uses bandwidth for good connections over bad connections, given the high error rate experienced with wireless USB. Periodic transfers are first attempted before asynchronous transfers, as long as the periodic transfers are successful. When failures are occurring, the hardware includes a mechanism having a software-configurable threshold specifying the number of errors a given endpoint can tolerate before it is paused in the schedule. By pausing transfer attempts that are likely to again fail, endpoints with successful transfers are favored over those experiencing errors. When the number of active transfers pending exceeds a software-configurable notification threshold for isochronous endpoints, the hardware notifies the software of this state, corresponding to a low-buffer condition at the receiver. The software may then reconfigure thresholds and deactivate other transfers to force data transfers into the buffer.

6 Claims, 6 Drawing Sheets

WIRELESS USB HARDWARE SCHEDULING

FIELD OF THE INVENTION

The invention relates generally to communicating data between computer systems and peripheral devices via wireless communications.

BACKGROUND

Almost all contemporary computer systems are configured to use USB (Universal Serial Bus), an external peripheral interface standard for serial communication between computer systems and external peripheral devices such as a mouse, a printer, a digital camera, and so forth. With USB, each peripheral device connects via a cable that plugs into a standardized USB port on the computer system.

In an effort to eliminate the need for USB cables to connect computers systems and the external peripherals, wireless USB (or WUSB) based on ultrawideband (UWB) technology is becoming standardized. Wireless USB is directed towards having communication speeds comparable to the USB 2.0 standard, e.g., 480 Mbps, over distances up to ten meters.

However, unlike wired USB where transmission errors are extremely rare, there is a significant packet error rate in UWB transmissions (e.g., on the order of ten percent) that must be compensated for in some way, otherwise a user's wireless USB experience will be noticeably inferior to that of wired USB. Attempts to resolve the problems caused by the high packet error rate, generally based on retrying failed packets, are complicated by the fact that there are different types of USB communications, including asynchronous (control and bulk data) communications, and periodic (interrupt and isochronous) communications, each with different transmission-related requirements. In wireless USB, devices communicate over UWB, whereby at any given time, the connection to one device may be experiencing very few packet errors, while the connection to another device may be experiencing many packet errors.

What is needed is a mechanism that compensates for the relatively significant error rate in wireless USB, in view of the many differences between wired USB and wireless USB. Such a mechanism should be sufficiently flexible such that software can control the mechanism as needed in a given environment.

SUMMARY OF THE INVENTION

Briefly, the present invention is directed towards a system and method by which hardware and software on a computer system work together to schedule USB wireless data transfers, in which failed transfers are retried in a controlled manner. Because wireless USB transfers are buffered at the receiving end, a successful retry supplies missing data for insertion into an appropriate position in the buffer. By retrying failed transfers in a controlled manner, in ordinary operation bandwidth is not wasted on retry attempts on connections that will most likely fail, but instead is used for connections that will likely succeed. However, in critical situations such as a low buffer condition at the receiving device, the controlling software can change the configurable scheduling parameters to force data transfer over the corresponding connection.

Four different types of data transfers (corresponding to endpoints) are supported by the wireless USB data transfer mechanisms of the present invention, including interrupt transfers, isochronous transfers, control transfers and bulk transfers. Interrupt transfers and isochronous transfers are periodic types of transfers, in that they are scheduled for transfer in a time slot that will become the current time slot via a periodic advance. Control transfers and bulk transfers are asynchronous, and are attempted if time remains after any periodic transfers in the current time slot. To provide an acceptable computing experience with wireless USB, the high error rate in data transfer requires that retries be performed, even on isochronous transfers, in which delivery is not guaranteed.

To schedule the various data transfers, the present invention comprises a wireless USB component in the hardware, and a wireless USB controller driver in the software. The wireless USB hardware includes a scheduling process that manipulates information in queue head data structures that correspond to endpoints, based on whether their associated packets were successfully received. The hardware scheduling process includes a mechanism having a software-configurable threshold that specifies the number of errors a given queue head (corresponding to an endpoint) can tolerate during a time period before the queue head is paused in the schedule such that packets associated with other queue heads may be transferred. The scheduling process thus handles retries of failed transfers in a software-controlled manner that avoids wasting bandwidth on data transfers that are likely to fail due to transient error conditions. The software controller driver also configures other information (e.g., thresholds) in the data structures.

A periodic schedule data structure comprises a circular buffer of entries in which each entry corresponds to a periodic time slot and contains pointers to a list of zero or more periodic schedule entries (PSEs). The periodic schedule entries represent the data transfers that should become active (and thus be transferred if possible) during that time slot period. To this end, the periodic schedule entries point to queue heads or transfer descriptors associated with queue heads, wherein the queue heads correspond to endpoints on the devices to which the transfer is being made. Each queue head contains information concerning the state of transfers, including any pending transfers for its corresponding endpoint. Each transfer descriptor provides the details for a specific transfer, such as the address to store or retrieve the actual data involved in the transfer, the length of the transfer buffer, the number of bytes actually transferred, and so forth. Each transfer descriptor also contains a state value of "Active" or "Inactive," along with a software-writeable value specifying if a transfer is on or off.

When an isochronous periodic schedule entry is encountered in the scheduling process, the corresponding transfer descriptor is moved to its "Active" state, signaling that the data is ready to be transferred as soon as possible. When an interrupt periodic schedule entry is encountered in the schedule, the corresponding queue head is moved to an "Active" state, signaling that the schedule should execute a packet transfer. The control transfers and bulk transfers are asynchronous and occur after periodic transfers, using any time remaining in a given time slot.

Software controls the hardware operation by writing to various threshold parameters, including an error count threshold that determines when to pause a queue head. More particularly, when an error counter in a queue head that was initialized with this threshold and is decremented on an error transitions from one to zero, that particular queue head is paused (no longer retried), which may be for the remainder of the time slot. Pausing allows other queue heads' packets to be transferred in the time slot, rather than reattempting transfer over a connection that has met the threshold error level and is thus likely to again fail. A paused queue head moves out of its paused state either at the beginning of the next time slot, or after the other endpoints (queue heads' packets) in the current time slot have been exhausted via success, pausing or halting and there is still remaining time (corresponding to available bandwidth) in the time slot that would be otherwise unused. Pausing a queue head in response to failed transfers thus allows the schedule to prefer endpoints that are able to successfully transfer packets over endpoints that are not.

Another threshold parameter specifies the number of consecutive errors before the queue head should be halted. Unlike the paused state which resets at the next time slot or when unused bandwidth remains in the current time slot, halted queue heads require software intervention in order to move out of the halted state.

An Isoch Notification Threshold parameter is set by the wireless USB software controller in order to have a notification sent to the software when too many transfer descriptors associated with a queue head are active because of not being successfully transferred, which essentially corresponds to a low buffer condition at the corresponding receiving device. When this number achieves the threshold, the hardware notifies the wireless USB software controller driver through an interrupt. The software may then adjust the thresholds to force data into a critically low buffer. Also, an "Enabled" parameter value may be set by software in order to turn a queue head off or on; when in the off state, no transfers are executed for that queue head, whereby data transfers can be concentrated to one or more endpoints in need of data.

The scheduling process restarts as the current time slot advances to the next time slot following a prior scheduling period. A first phase of a schedule cycle involves resetting the schedule state and determining the periodic transfer needs for that time slot, including activating appropriate inactive queue heads and transfer descriptors. In this phase, per-period initialization also occurs, and a notification is sent if the Isoch Notifications Threshold has been achieved for any queue head.

A second phase of the schedule cycle is directed to executing the periodic (isochronous and interrupt) transfers and analyzing the results. In general, the hardware searches for periodic queue heads that are currently active and starts to execute packet transfers for that queue head's corresponding transfer descriptors. Successful transfers are marked as complete until no more active transfer descriptors remain, in which event the queue head is deactivated. Failures result in the error counts being decremented, which may halt or pause future transfer attempts when a respective value transitions from one to zero. The process returns until each attempted periodic transfer has been analyzed and none remain to be attempted, that is, the periodic transfers were completed, paused or halted.

Once there are no active periodic queue heads to transfer, the schedule executes the third phase, directed towards the transferring of asynchronous (control and bulk) queue heads. Asynchronous transfers similarly are attempted until completed, paused or halted based on error counters in the asynchronous queue heads. If time remains in the current time slot, the second and third phases are repeated.

As can be seen, periodic transfers are attempted first, but queue heads that fail a threshold number of times are paused (or halted), so as to not waste available bandwidth by making repeated transfer attempts that are likely to again fail. The remaining time is instead used for attempting asynchronous transfers, which are similarly paused (or halted) if failing. The present invention thus may alternate between periodic transfer attempts and asynchronous failure attempts as necessary within a time slot, but in a controlled manner.

Other advantages will become apparent from the following detailed description when taken in conjunction with the drawings, in which:

DETAILED DESCRIPTION

Exemplary Operating Environment

Figure 1:
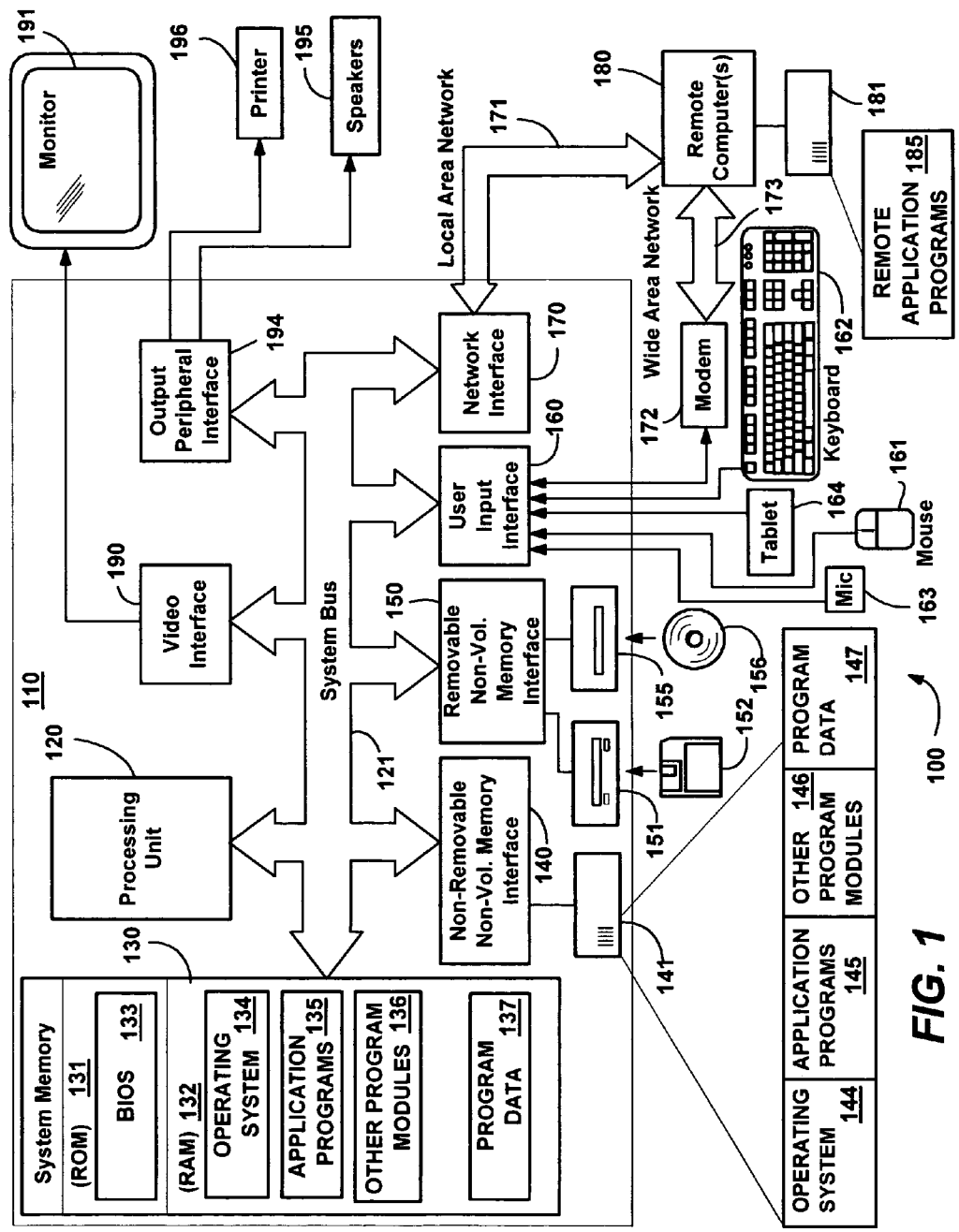
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Wireless USB Hardware Scheduling

The present invention is generally directed towards a system and method by which wireless USB data structures that are not successfully transferred have their transfers retried in a controlled manner, such that bandwidth is not wasted on retry attempts on connections that will most likely fail, but instead is used for connections that will likely succeed. To this end, software-configurable parameters are used by hardware to intelligently manage the scheduling of transfers in view of the type of conditions that normally cause transfer errors, namely transient error conditions. As will be also understood, numerous ways to implement the present invention are feasible, and only some of the alternatives are described herein. For example, the present invention is primarily described below with reference to a hardware-executed schedule that operates by marking data structures and maintaining and evaluating their internal counters, based on software-provided thresholds and initialization values that control the scheduling hardware's behavior in order to optimize performance. Other hardware then takes the data structures that are marked as active and transmits corresponding data, using an ultra-wideband radio. Notwithstanding, other types of transmission mechanisms are feasible, and indeed, the present invention can be used in wired technologies, such as in future versions of USB where greater transfer rates may result in higher error counts. As such, the present invention is not limited to any particular examples used herein, but rather may be used in various ways that provide benefits and advantages in computing in general.

Moreover, although the present invention will primarily be described with reference to a host computer system that has one or more peripheral devices to which it transmits wireless USB data, it will be understood that other types of devices may comprise a host. For example, an audio and/or video USB player or the like can be sending packets to a receiving host television set, or audio player and so forth.

Figure 2:
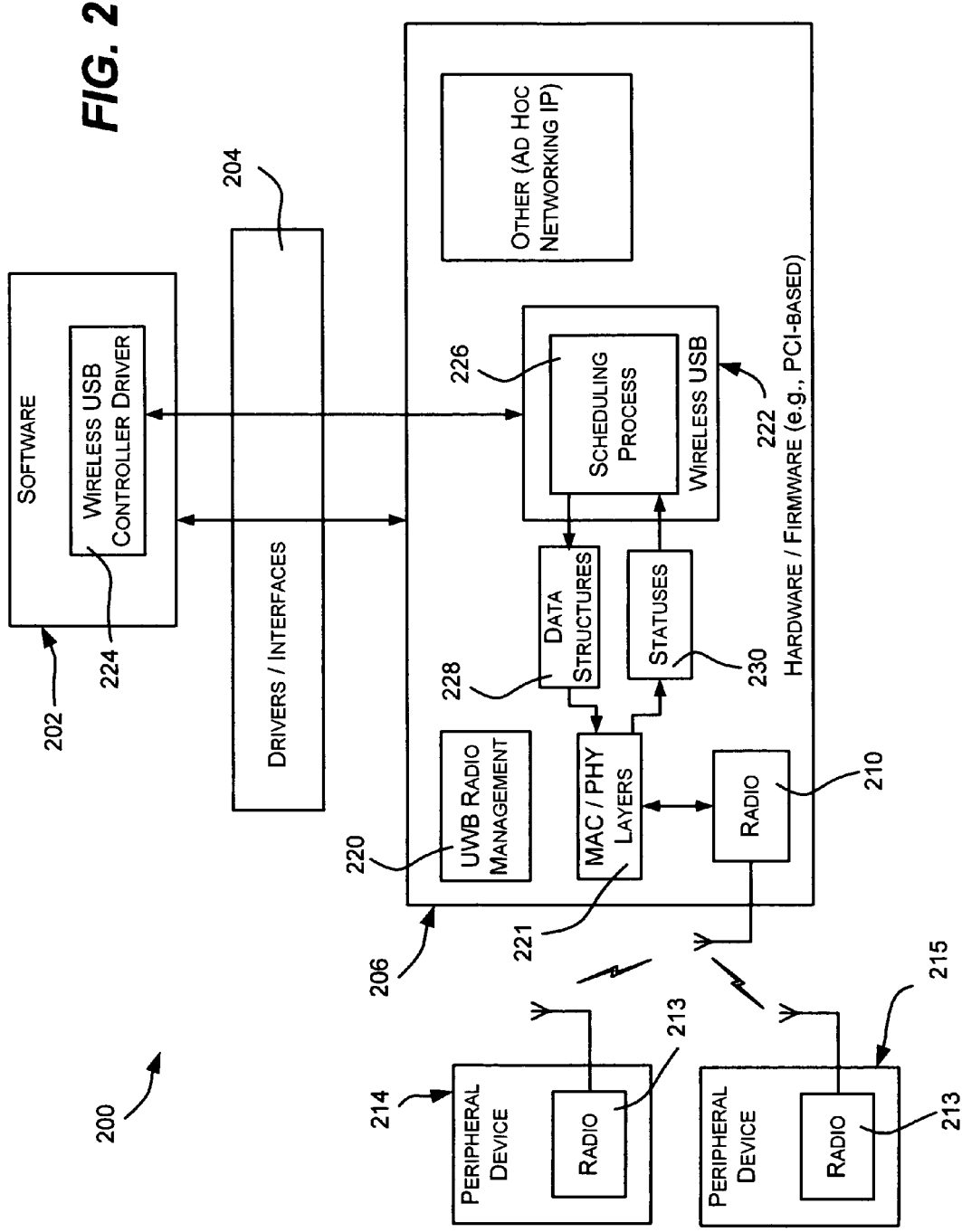
FIG. 2 is a block diagram including software and hardware in a computer system for controlling wireless USB data transfers over UWB to a peripheral device using hardware scheduling, in accordance with various aspects of the present invention.

FIG. 2 shows an example architecture 200 in which software 202, running on a host computer, communicates via drivers/interfaces 204 with hardware/firmware 206 (for brevity hereinafter referred to simply as hardware). For example, the software 202 can be an operating system component or the like running on the computer system 120 of FIG. 1, while the hardware 206 may be configured on a PCI-based card or the like plugged into the main computer system 120. As can be readily appreciated, other alternatives, such as building wireless USB into a computer system, are equivalent.

In general, the hardware 206 includes a radio transceiver 210 or the like, arranged to communicate with one or more counterpart radio transceivers, e.g., transceivers 212 and 213 of peripheral devices 214 and 215, respectively. Although only two peripheral devices 214 and 215 are shown in FIG. 2, it is understood that there may be any practical number of wireless peripheral devices communicating with the computer system's radio 210. The host may also have wired USB connections (not shown).

Although not described herein in detail for purposes of brevity, FIG. 2 shows a UWB radio management component 220 comprising a hardware/software interface that is used to manage radio resources that are shared among different Protocol Adaptation Layers (PALs, e.g., WUSB, ad hoc networking, and so forth) on the host computer. As is understood, UWB MAC (media access control) and PHY (physical) layers 221 can be considered as being responsible for the data transfer process, that is, sending data and obtaining status information as to which data was successfully received, as well as returning status information when data is successfully received from a peripheral device. These layers 221 manage the communication of data packets, return statuses and the like exchanged with the peripheral devices 214 and 215, generally in a parallel operation as known in ultra wideband technology. As will be understood, the present invention is generally directed towards scheduling the data for transfer, including performing a controlled retry of data structures that were not successfully transferred, based on returned status information.

To schedule the data transfers, the present invention comprises a wireless USB component 222 in the hardware, and a wireless USB controller driver 224 in the software. As described below, the wireless USB component 222 includes a scheduling process 226 that manipulates information in various types of data structures 228 based on corresponding status information 230 returned (or the absence of status information that should have been returned) by the peripheral devices 214 and 215. As also described below, the software wireless USB controller 224 configures some of the information in the data structures, such that the scheduling process handles retries of failed transfers in a software-controlled manner that avoids wasting bandwidth on data transfers that are likely to fail.

More particularly, as mentioned above, due to the nature of UWB, the scheduling of wireless USB transfers cannot be identical to wired USB, because among other differences, there is a much greater packet error rate for UWB that needs to be compensated for in some way, which in one implementation of the present invention is via the design of the hardware and the software. This hardware and software design is generally based on a typically observed behavior with UWB communications, namely that if a packet transfer fails between two nodes, the probability is that the next packet transfer between the same nodes will also likely fail. Conversely, if a packet transfer succeeds, the probability is that the next packet transfer between the same nodes will also likely succeed. Thus, if viewed over time, packet failures on a given connection generally occur in bunched-up spikes, as opposed to being evenly distributed over time. Such error condition states are thus transient, and ordinarily clear up over time.

Based on these observations, the present invention provides retry mechanisms that can be configured by software to prevent wasting bandwidth on retries that will most likely fail. In an attempt to maximize total throughput, this present invention thus normally provides a mechanism that favors successful transfers, but allows software reconfiguration as needed, such as to change normal operating behavior in order to fulfill critical requests.

As is known in USB technology generally, there are various types of data transfer operations, corresponding to endpoints. Current wired USB standards define four transfer/endpoint types, namely control transfers, bulk transfers, interrupt transfers and isochronous transfers. Control transfers, typically used for command and status operations, are asynchronous and guaranteed to be delivered. Bulk transfers, also asynchronous, are typically used for large bursts of data, and are also guaranteed to be delivered, but without any guarantee as to latency or bandwidth. Such asynchronous transfers occur in a transfer time slot after other (periodic) transactions for that time slot, and thus are not used for time-sensitive transfers.

Interrupt transfers may be device-initiated transfers, and require bounded latency. Interrupt transfers are queued by a device until polled, with polling occurring during a periodically recurring time-slot. Host-initiated interrupt communications are also sent based on the periodic time-slot. Interrupt transfers are guaranteed to be delivered.

Isochronous transfers are periodic (scheduled per time slot), and typically used for transferring time-sensitive information, such as video and audio streaming. Isochronous transfers provide guaranteed bandwidth and bounded latency, but there is no guarantee of delivery.

Wireless USB supports these endpoints, however as described above, the high error rate in data transfer requires that retries be performed, even on isochronous transfers where delivery is not guaranteed. Note that unlike wired transfers, wireless isochronous transfers are buffered, allowing a retry to supply missing data for insertion at the receiver into an appropriate position in the buffer.

In accordance with an aspect of the present invention, the data structures corresponding to an endpoint are scheduled by the scheduling process 226 in a controlled manner that is directed towards favoring data transfers that are likely to succeed over those that are likely to fail, thereby using bandwidth at any given moment for what are currently good connections rather than for what are currently bad connections. To this end, the scheduling process sets up a transfer schedule as described below, where in general, successively-failed transfers are paused until the next time slot for data transfer, whereby those transfers do not consume additional bandwidth in likely-to-fail retry attempts.

Figure 3:
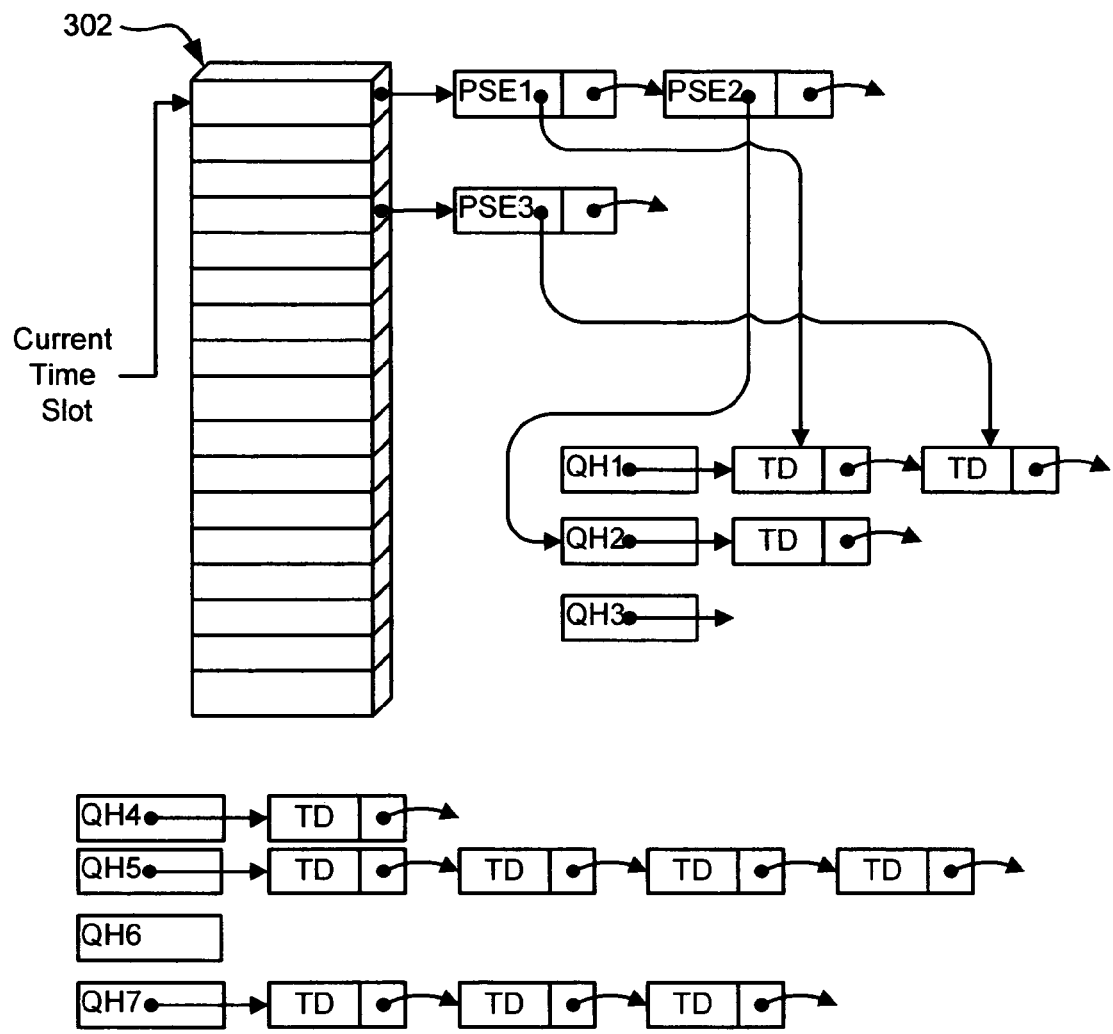
FIG. 3 is a block diagram including representations of data structures used in hardware scheduling of data transfers, in accordance with various aspects of the present invention.

FIG. 3 is a representation of the various data structures managed by the scheduling process 226 and their relationships with one another. As represented in FIG. 3, the data structures include a periodic schedule 302, periodic schedule entries (e.g., PSE1–PSE3), queue heads (QH1–QH7) and transfer descriptors (TDs). The periodic schedule 302 comprises a circular buffer of entries, in which each entry corresponds to a periodic time slot. Each entry contains pointers to a list of zero or more periodic schedule entries (PSEs), which comprise pointers to other data structures, as described below. The time slot represents a single unit of time, wherein the time unit is (at most) the smallest period that is allowed to be specified by an endpoint. The "Current Time Slot" pointer advances to the next entry at the end of a time period.

The periodic schedule entries represent the data transfers that should become active (be transferred by the UWB components) during that time slot period. Each periodic schedule entry represents a transfer that is ready to be executed.

To designate a destination for a transfer, there is a queue head (QH) that corresponds to each endpoint on each device to which the transfer is being made. As described below, each queue head contains information concerning the state of transfers, including any pending transfers for its corresponding endpoint.

Each transfer descriptor (TD) has an associated queue head, and provides the details for a specific transfer, such as the address to store or retrieve the actual data involved in the transfer, the length of the transfer buffer, the number of bytes actually transferred, and so forth. Each transfer descriptor also contains a state value of "Active" or "Inactive," along with a software-writeable value specifying if a transfer is on or off.

There are two types of periodic schedule entries, one type for isochronous endpoints and one type for interrupt endpoints. As described below, isochronous PSEs point to isochronous transfer descriptors, while interrupt PSEs point to interrupt endpoint queue heads, which in turn point to corresponding transfer descriptors. For example, in the example of FIG. 3, PSE1 points to an isochronous transfer descriptor (associated with queue head QH1), while PSE2 points to a queue head (QH2), corresponding to an interrupt endpoint. Periodic schedule entry PSE3, contained in a different time slot, points to another isochronous transfer descriptor (associated with queue head QH1).

As described below, when an isochronous PSE is encountered in the scheduling process, the corresponding transfer descriptor is moved to its "Active" state, signaling that the data is ready to be transferred as soon as possible. When an Interrupt PSE is encountered in the schedule, the corresponding queue head is moved to an "Active" state, signaling that the schedule should execute a packet transfer. Queue heads not having a PSE in FIG. 3, e.g., QH4–QH7, represent asynchronous transfers that occur after periodic transfers, using any time remaining in a given time slot.

In accordance with an aspect of the present invention, to provide flexibility to adapt to various operating environments, the WUSB controller driver 224, which may comprise an operating system component or application program, may control various aspects of schedule execution. A primary way for software to manipulate the schedule execution is through the queue heads. More particularly, there are various parameter (counter and threshold) values maintained in the queue head that software may modify, and thereby modify the behavior of schedule execution, as will be understood via the flow diagram of FIGS. 4–6, described below. The following table provides information on some of the values that are contained within each queue head, including which values are hardware and software read-writable or read-only:

| | | | |
|---|---|---|---|
| | Queue Head Values | | |
| Value Name | SW Access | HW Access | Description |
| Current Error Count | RO | RW | The number of errors left that can be encountered before the queue head is paused since the last queue head reset. |
| Error Pause Threshold | RW | RO | The number of failed packets that the schedule should allow for the given queue head before the queue head is paused. On a queue head reset, the Current Error Count value is initialized with this value. A value of 0 indicates that the queue head should not be paused. |
| Consecutive Error Count | RO | RW | The current number of consecutive errors for the given queue head. |
| Error Halt Threshold | RW | RO | This value indicates the number for consecutive packet errors that can occur before the hardware sets the queue head state to Halted. |
| Isoch Notification Threshold | RW | RO | This value indicates the number of active TDs for the given queue head after which the hardware should issue an interrupt. This field is to allow the software to rebalance the schedule if an isoch stream is falling behind. |

-continued

Queue Head Values

| Value Name | SW Access | HW Access | Description |
|---|---|---|---|
| Current Active TD Count | RO | RW | The current number of active TDs for the give queue head. |
| Enabled | RW | RO | This value enables the given queue head. If this value is zero, the hardware shall not execute any transfers associated with the queue head. |
| State | RO | RW | The current state of the queue head. It can be one of the following states:<br>1. Active - there are transfers that are ready to be executed<br>2. Inactive - there are no transfers that are ready to be executed<br>3. Halt - An error condition has been reached that requires software attention<br>4. Pause - The endpoint reached the threshold for number of failures (Error Pause Threshold) and will no longer have transfers executed until the next time slot or until hardware clears this condition. |

As indicated in the table, software can write a value to the Error Pause Threshold parameter in the queue head to determine the number of failed packets that the schedule allows before that particular queue head is paused (no longer retried), which may be for the remainder of the time slot. This is a primary way by which the schedule can be optimized by software in view of known transfer failure characteristics (e.g., transient error spikes) as described above. The Error Pause Threshold value is set by software to indicate how good or bad a connection needs to be to continue to execute transfers. If this value was set to one (1), then as long as there are still active transfers pending in the queue head and there have been no failed packet transfers in this time slot, the schedule will continue to execute that queue head's transfers.

However, once a packet transfer fails, a "Current Error Count" value is decremented; when it transitions from one (1) to zero (0), the queue head is paused. This prevents further transfers from executing during the given time slot until other queue heads have been fully serviced (to the extent that they also are not paused). As can be readily appreciated, if the value is set to two (2) then it would take two failed packet transfer attempts before the queue head was paused, and so on. A starting value of 0 indicates that the queue head should never be paused, (because as described below, there will be no transition from one to zero in such a situation).

In general, a paused queue head moves out of its paused state either at the beginning of the next time slot, or after the other endpoints in the current time slot have been exhausted when there is remaining bandwidth that would be otherwise unused. Pausing failed transfers allows the schedule to prefer endpoints that are able to successfully transfer packets over endpoints that are not. Because transmission errors tend to be transient, during the next time slot, the endpoint having transfer errors may be more successful. In the event that conditions reach a point where packets are urgently needed at a particular endpoint, the wireless USB software controller driver 224 is notified and can adjust the various configurable values in the queue head for that endpoint, essentially favoring the endpoint needing data over other endpoints in order to increase the probability of successfully transferring a packet, at the expense of bandwidth that could have been used for other transfers.

The Error Halt Threshold parameter is somewhat similar to the Error Pause Threshold parameter, however this value specifies the number of consecutive errors before the queue head should be halted. Unlike the paused state which resets at the next time slot or when unused bandwidth remains in the current time slot, halted queue heads require software intervention in order to move out of the halted state.

The Isoch Notification Threshold parameter is a value that may be set by the wireless USB software controller driver 224 in order to have a notification sent to the software, as is used so that the wireless USB software controller driver 224 is notified about particularly bad failure conditions. More particularly, Isochronous streams in wireless USB involve a certain amount of buffering on both the receiving and the sending side; as long as the sending side does not overflow, the stream is maintained. In order to ensure that the buffer does not overflow, the host may need to adjust some settings in response to the state of the buffer. The Isoch Notification Threshold defines when the hardware should notify the wireless USB software controller driver 224 based on the state of the buffer. The Isoch Notification Threshold value is defined as the number of active Isoch transfer descriptors (TDs) associated with the queue head. Once this number reaches the value of Isoch Notification Threshold, the hardware notifies the wireless USB software controller driver 224 through an interrupt.

The Enabled value may be set by software in order to turn a queue head off or on. When it is in the off state, no transfers are executed.

Figure 4:
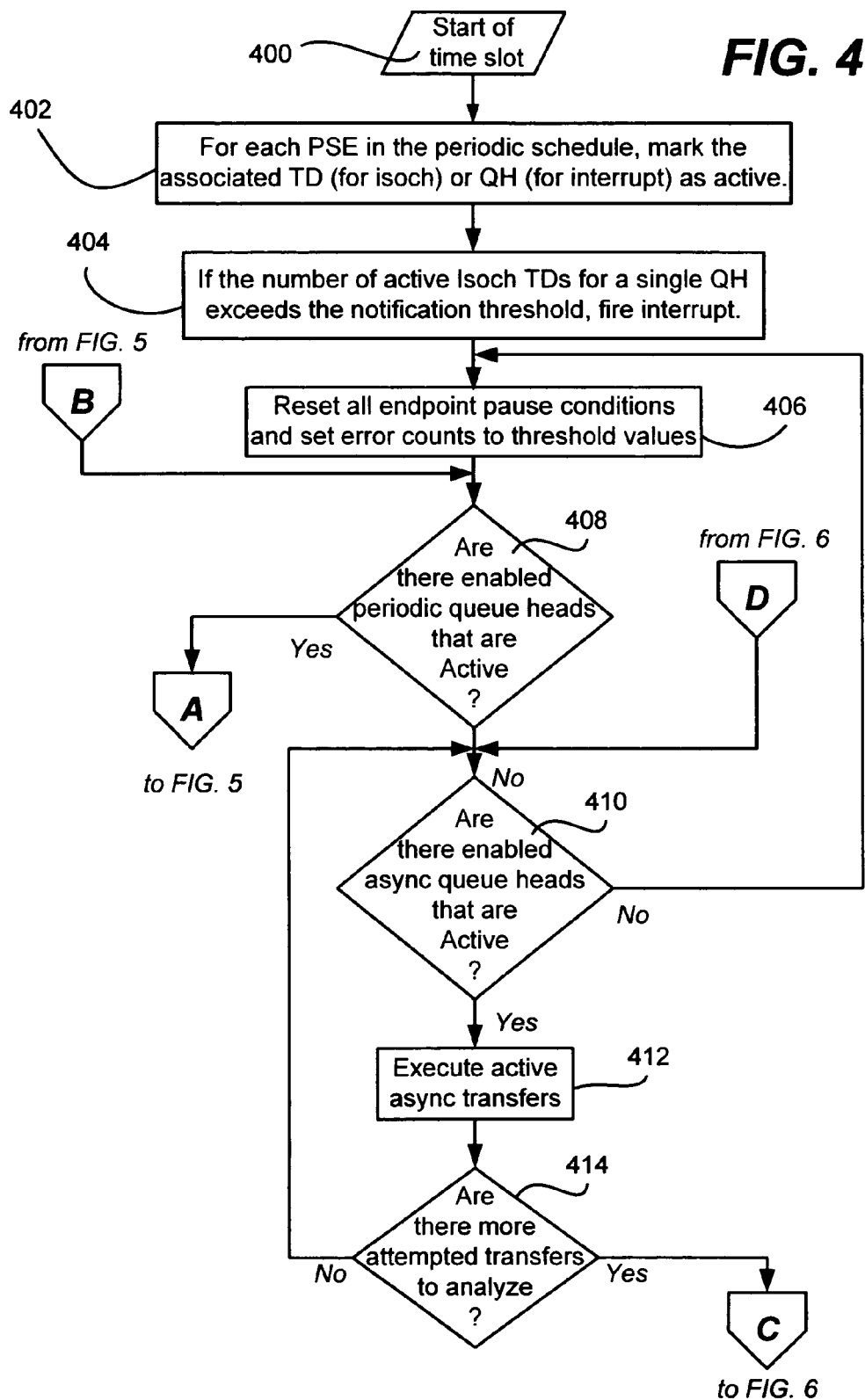
FIG. 4–6 comprise a flow diagram generally representing logic for manipulating the data structures to perform controlled data transfers, in accordance with various aspects of the present invention.
Figure 5:
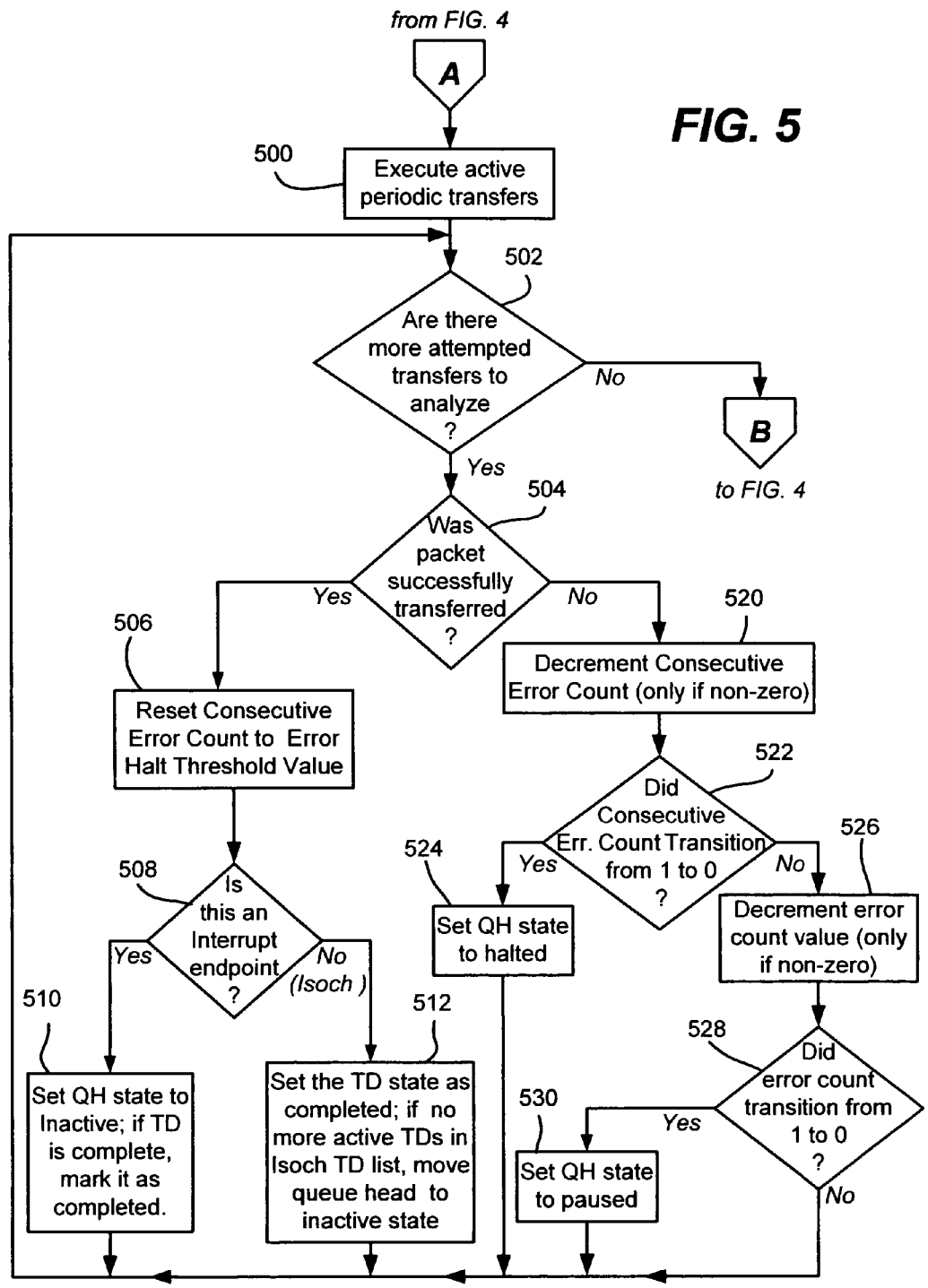
Figure 6:
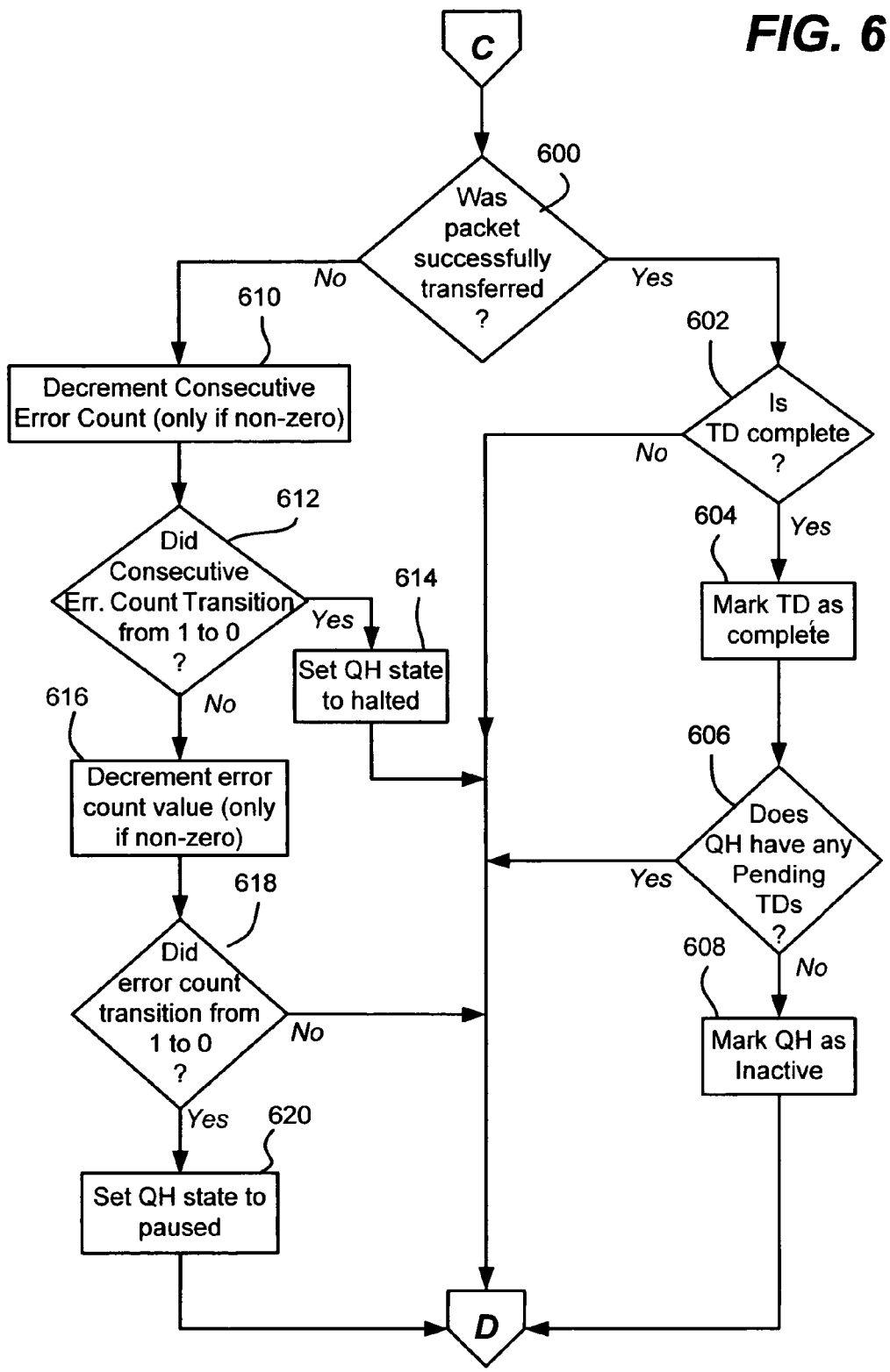

Turning to an explanation of the present invention, FIGS. 4–6 describe example logic of the scheduling process 226 with respect to operations and events that occur in each time slot, beginning at step 400 of FIG. 4 which represents the start of a time slot. Essentially there are different phases to a schedule cycle, wherein the start of a time slot initiates a new cycle. When that new cycle completes, if there is time remaining before the next time slot is to begin, a new cycle can execute, or a partial cycle, in which anything that was scheduled for transfer but was not completed may be reattempted.

A first phase of a schedule cycle involves resetting the schedule state and determining the periodic transfer needs for that time slot. In this phase, the Current Time Slot pointer has been incremented to point to a new current time slot, represented by step 400. Then, if that time slot points to any PSEs, the list of PSEs is walked. For every interrupt PSE in the list, the corresponding interrupt endpoint queue head is activated (unless the endpoint is in the halt state). For every Isochronous PSE in the list, the corresponding isochronous endpoint transfer descriptor is activated, along with the queue head. This is represented in FIG. 4 at step 402, wherein resetting the schedule state for the new time slot involves transitioning each queue head that is in a "Pause" state to an "Active" state.

Other steps include steps 404 and 406, where step 404 represents firing the interrupt to notify software whenever the notification threshold has been achieved, based on the number of active Isoch transfer descriptors for a single queue head. Step 406 reinitializes the values for this time slot.

A second phase of the schedule cycle is directed to executing periodic transfers. In general, the hardware searches for periodic queue heads that are currently active (step 406) and starts to execute packet transfers for that queue head's corresponding transfer descriptors, as represented at step 500 of FIG. 5. For WUSB, multiple transfers may be executed in parallel. The scheme for deciding which transfers to execute at a given time is not pertinent to the present invention, except that in general the scheme should be based on minimizing transfer turnaround (changing the radio from a transmitting state to a receiving state), as well as keeping protocol overhead low. Note that the WUSB hardware may choose to execute some asynchronous transfers at the same time as the other multiple packet transfers.

For each periodic packet transfer (step 502), the status of that transfer is analyzed via step 504. If the packet transfer succeeded, then step 504 branches to step 506 where the corresponding Consecutive Error Count is reset to the value of the Error Halt Threshold. If at step 508 the endpoint is an interrupt endpoint, then the corresponding queue head is put into the inactive state via step 510, and, if that packet transfer also completed a transfer descriptor, then the transfer descriptor is marked as completed.

If the packet transfer succeeds at step 504 and the endpoint is an isochronous endpoint at step 508, then step 508 instead braches to step 512 where the transfer descriptor is marked as completed. Also, if there are no more active transfer descriptors in the isochronous transfer descriptor list, then the queue head is moved to the inactive state.

Returning to step 504, if the packet transfer failed, then step 504 branches to step 520 where the Consecutive Error Count is decremented (if greater than zero). If as evaluated by step 522, this value transitions from a value of one (1) to a value of zero (0), then the queue head is halted via step 524. Otherwise, step 526 is executed, where the current error count in the queue head is decremented if it is greater than zero. If this count transitions from a value of one (1) to a value of zero (0) as evaluated at step 528, then the queue head is moved to the paused state via step 530. Note that if the error count was already at zero, then the state of the queue head is left intact; this allows the error count of the queue head to be initially set by software to zero, whereby its state will not be paused. A similar "initialize-to-zero" operation may be used with the consecutive error count to prevent halting.

As can be seen by the process returning to step 502, the analysis of FIG. 5 continues until each attempted transfer has been analyzed.

Once this process has completed, the hardware scheduling process 226 will return to FIG. 4, step 408, to again determine if there are more periodic queue heads that are active and execute them (these could include queue heads with transfers that have already been attempted). This will repeat until there are no active periodic queue heads left, that is, until only paused or halted ones may remain pending. Once there are no active periodic queue heads, the schedule executes the third phase, directed towards the transferring of asynchronous queue heads. In the third phase, any active asynchronous (Bulk and Control) transfers are executed via steps 410 and 412. For each packet transfer the status of that transfer is analyzed, as represented by step 414 branching to FIG. 6, beginning at step 600.

Step 600 evaluates whether the packet transfer succeeded, and if so, branches to step 602 where an evaluation is made as to whether that packet completed the transfer descriptor; if so, then the transfer descriptor is marked as completed at step 604. Also, if there are no more transfer descriptions pending in the queue head, then the queue head is moved to the inactive state via steps 606 and 608. The process returns to step 410 of FIG. 4.

Returning to step 600, if the packet failed, then step 600 branches to step 610 where the queue head's Consecutive Error Count is decremented (if greater than zero). If at step 612, this value transitions from a value of one (1) to a value of zero (0), then the queue head is halted via step 614.

Otherwise, at step 616 the queue head's Current Error Count value is decremented (if its value is greater than zero). If at step 618 this value is determined to have transitioned from a value of one (1) to a value of zero (0), then the queue head is paused at step 610.

The process returns to step 410 of FIG. 4, where this third phase repeats until there are no more active asynchronous queue heads remaining, or the time slot ends. Note that by step 410 branching to step 406 when the third (asynchronous handling) phase ends with more time left in the time slot, any paused QHs are moved to the active state at step 406, and phases two (FIG. 5) and three (FIG. 6) are repeated.

Thus, it is seen that an attempt is made to schedule and transfer any active periodic queue heads within the time slot until the transfer is successful, paused or halted. Then, an attempt is made to transfer any asynchronous queue heads within the time slot until the transfer is successful, paused or halted. The process repeats until time runs out in the time slot, although the process may also stop when everything scheduled for the time slot has been successfully transferred, and then restart with newly scheduled queue heads at the next appropriate time.

Because software controls the various counters and other information in the data structures, a significant amount of flexibility is provided by the present invention. For example, in normal operation, the error count may be initialized to one (1) at the start of the time slot, whereby a single error will cause the queue head that failed to be paused for the remainder of that time slot, (unless reactivated because additional time remains in the time slot). As a result, attempts to transfer other queue heads will be made in that time slot before any reattempt is made to transfer the queue head that failed. However, upon receiving a notification when an isochronous notification threshold is reached, the software will recognize that the buffer of a receiving side is getting low because transmission failures have caused too many active transfer descriptors to back up. The software may then adjust the various counts to force data into that buffer, e.g., by increasing the error count values for the particular queue head corresponding to the backed up transfer descriptors, disabling some other queue heads, and so forth. The software may then reset the counters and thresholds for normal operation once enough data has been forced into the buffer.

As can be seen from the foregoing detailed description, there is provided a method and system that handles the errors in wireless USB by using bandwidth for packets corresponding to queue heads that are more likely to succeed that others that are more likely to fail. Software can dynamically control the mechanism as needed in a given environment.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
 (a) activating periodic data transfers for transferring to a wireless USB endpoint when in a current time slot among a set of time slots, each data transfer associated with a queue head containing information for transferring one or more data packets corresponding to the data transfer;
 (b) attempting to transfer periodic packets associated with queue heads that are active;
 (c) evaluating whether a subsequent data transfer to an endpoint is likely to fail based on whether at least one previous data transfer attempted to that endpoint was successful, and if likely to fail, pausing the subsequent data transfer, and if not likely to fail, attempting the subsequent data transfer; and
 (d) determining whether any periodic data transfers remain in an active state to be transferred, and if so, returning to step (b) if time remains in the current time slot.

2. The method of claim 1 wherein evaluating whether a subsequent data transfer to an endpoint is likely to fail comprises updating a failure counter and evaluating the failure counter based on a threshold value.

3. The method of claim 1 wherein at step (d), no periodic data transfers remain in an active state to be transferred and time remains in the current time slot, and further comprising,
 (e) attempting to transfer packets associated with asynchronous queue heads that are active;
 (f) evaluating whether a subsequent data transfer to an asynchronous endpoint is likely to fail based on whether at least one previous data transfer attempted to that endpoint was successful, and if likely to fail, pausing the subsequent data transfer, and if not likely to fail, attempting the subsequent data transfer; and
 (g) determining whether any asynchronous queue heads include data transfers that remain in an active state to be transferred, and if so, returning to step (e) provided time remains in the current time slot, and if not, activating any paused queue heads and returning to step (b) provided time remains in the current time slot.

4. The method of claim 3 wherein evaluating whether a subsequent data transfer to an asynchronous endpoint is likely to fail comprises updating a failure counter and evaluating the failure counter based on a threshold value.

5. The method of claim 1 further comprising, for each queue head, evaluating a number of active isochronous transfer descriptors against a notification threshold, and if the threshold value is achieved, sending a notification regarding that queue head.

6. At least one computer-readable medium having computer-executable instructions, which when executed perform the method of claim 1.

* * * * *